United States Patent

Kosugi et al.

[11] Patent Number: 5,903,677
[45] Date of Patent: May 11, 1999

[54] IMAGE ENCODING AND RECORDING APPARATUS

[75] Inventors: Masato Kosugi, Machida; Taku Yamagami, Yokohama, both of Japan

[73] Assignee: Canon Kabushiki Kaisha, Tokyo, Japan

[21] Appl. No.: 08/465,715

[22] Filed: Jun. 6, 1995

Related U.S. Application Data

[63] Continuation of application No. 07/670,272, Mar. 15, 1991, abandoned.

[30] Foreign Application Priority Data

| Mar. 16, 1990 | [JP] | Japan | 2-66110 |
| Mar. 16, 1990 | [JP] | Japan | 2-66111 |
| Mar. 16, 1990 | [JP] | Japan | 2-66112 |
| Mar. 16, 1990 | [JP] | Japan | 2-66119 |

[51] Int. Cl.⁶ .......................... H04N 1/21; H04N 1/413; H04N 1/419
[52] U.S. Cl. .......................... 382/246; 358/404; 358/426; 358/909.1
[58] Field of Search .................. 358/909.1, 444, 358/404, 426, 261.1, 443, 468; 395/115, 116; 382/246, 232

[56] References Cited

U.S. PATENT DOCUMENTS

| 4,580,162 | 4/1986 | Mori | 358/400 |
| 4,884,147 | 11/1989 | Arimoto | 358/443 |
| 4,916,537 | 4/1990 | Nakayama et al. | |
| 4,922,273 | 5/1990 | Yonekawa et al. | 358/429 |
| 4,947,448 | 8/1990 | Nakayama et al. | |
| 4,992,889 | 2/1991 | Yamagami et al. | 358/430 |
| 5,018,017 | 5/1991 | Sasaki et al. | 358/909 |
| 5,027,214 | 6/1991 | Fujimori | 358/909 |
| 5,119,210 | 6/1992 | Baba | 358/404 |
| 5,223,948 | 6/1993 | Sakurai et al. | 358/404 |

FOREIGN PATENT DOCUMENTS

| 0179291 | 4/1986 | European Pat. Off. |
| 0336317 | 10/1989 | European Pat. Off. |
| 61-182669 | 8/1986 | Japan . |
| 63-237671 | 10/1988 | Japan . |
| 63-284974 | 11/1988 | Japan . |
| 1-198185 | 8/1989 | Japan . |
| 1-267781 | 10/1989 | Japan . |
| 2-014667 | 1/1990 | Japan . |

OTHER PUBLICATIONS

ISO/JJC1/SC2/WG8/N800.

*Primary Examiner*—Scott Rogers
*Attorney, Agent, or Firm*—Fitzpatrick, Cella, Harper & Scinto

[57] ABSTRACT

An image coding apparatus which includes a first means for fixing or limiting quantity of code produced by compressively coding a given image data, independent of the image, a second means for conducting variable length compression of which quantity of code produced varies according to the image, and a selection means for selecting the first and second means.

22 Claims, 7 Drawing Sheets

IMAGE ENCODING AND RECORDING APPARATUS

This application is a continuation of application Ser. No. 07/670,272 filed Mar. 15, 1991, now abandoned.

BACKGROUND OF THE INVENTION

1. Field of the Invention

The present invention relates to an image encoding apparatus for compression encoding of image signal and an image recording apparatus for recording image signal.

2. Related Background Art

Conventional image recording apparatus, for example still video camera, is based for example on analog signal recording on floppy disks or recording of digital image data, compressed by fixed length encoding, in semiconductor memory cards The fixed length encoding means a compression encoding in such a manner that the amount of compressed codes of an image frame becomes equal to a predetermined value.

Such conventional image signal recording methods can guarantee the number of images recordable per recording medium, because the capacity thereof required for recording image data of an image frame is predetermined.

However, for example in a digital still video camera employing image data compression with a fixed length encoding method, the rate of compression can empirically be only increased to the order of 8 bit/pixel, including the luminance and the color information, in order to guarantee the quality of compressed image for various image data, for example those involving fine patterns. Thus the fixed length encoding cannot achieve a sufficiently high compression rate. On the other hand, a variable length encoding method can achieve efficient compression while guaranteeing sufficient image quality. The variable length encoding generates codes of variable length depending on the image, and empirically provides an encoding rate of 2–4 bit/pixel, including the luminance and color information and guaranteeing the image quality In this case, however, it is not possible to guarantee the total number of images recordable per recording medium, because the total amount of codes varies according to the image. Also if the capacity of the recording medium is limited, the image may not be recordable on the recording medium Consequently, such variable length encoding method, if employed in a recording apparatus, results in a significant inconvenience as the user is unable to recognize, in advance, the number of images still recordable on the recording medium As explained in the foregoing, a system employing fixed length encoding has been unable to guarantee the image quality, while a system employing variable length encoding has been unable to guarantee the number of recordable images. Thus either system has been inconvenient for the user.

SUMMARY OF THE INVENTION

In consideration of the foregoing an object of the present invention is to provide an image encoding method or apparatus, or an image recording method or apparatus, capable of individually or collectively resolving the drawbacks mentioned above.

Another object of the present invention is to provide an image recording apparatus capable of presetting the stable recording conditions prior to the actual recording operation Still another object of the present invention is to provide an apparatus allowing the operator to know, prior to a recording operation, whether such recording operation is possible or not.

Still another object of the present invention is to provide an image recording apparatus employing a variable length encoding method and still convenient for use.

The above-mentioned objects can be attained, according to a preferred embodiment of the present invention, by an apparatus provided with first means for effecting variable length encoding on signals obtained by photoelectric conversion of an object image thereby generating variable length code data; recording means for recording said variable length code data on a medium; and second means for converting said object image to generate a value corresponding to the amount of said variable length code data, prior to the recording by said recording means.

Still another object of the present invention is to provide an image encoding method or apparatus which is convenient for use and still allows efficient use of the recording capacity of the recording medium.

Still another object of the present invention is to provide a novel image recording apparatus having image taking capability.

Still other objects of the present invention, and the advantages thereof, will become fully apparent from the following description of the embodiments thereof, to be taken in conjunction with the attached drawings.

BRIEF DESCRIPTION OF THE DRAWINGS

FIGS. 6-1 and 6-2 are flow charts of the control sequence of another embodiment of the present invention.

DETAILED DESCRIPTION OF THE PREFERRED EMBODIMENTS

Figure 1:
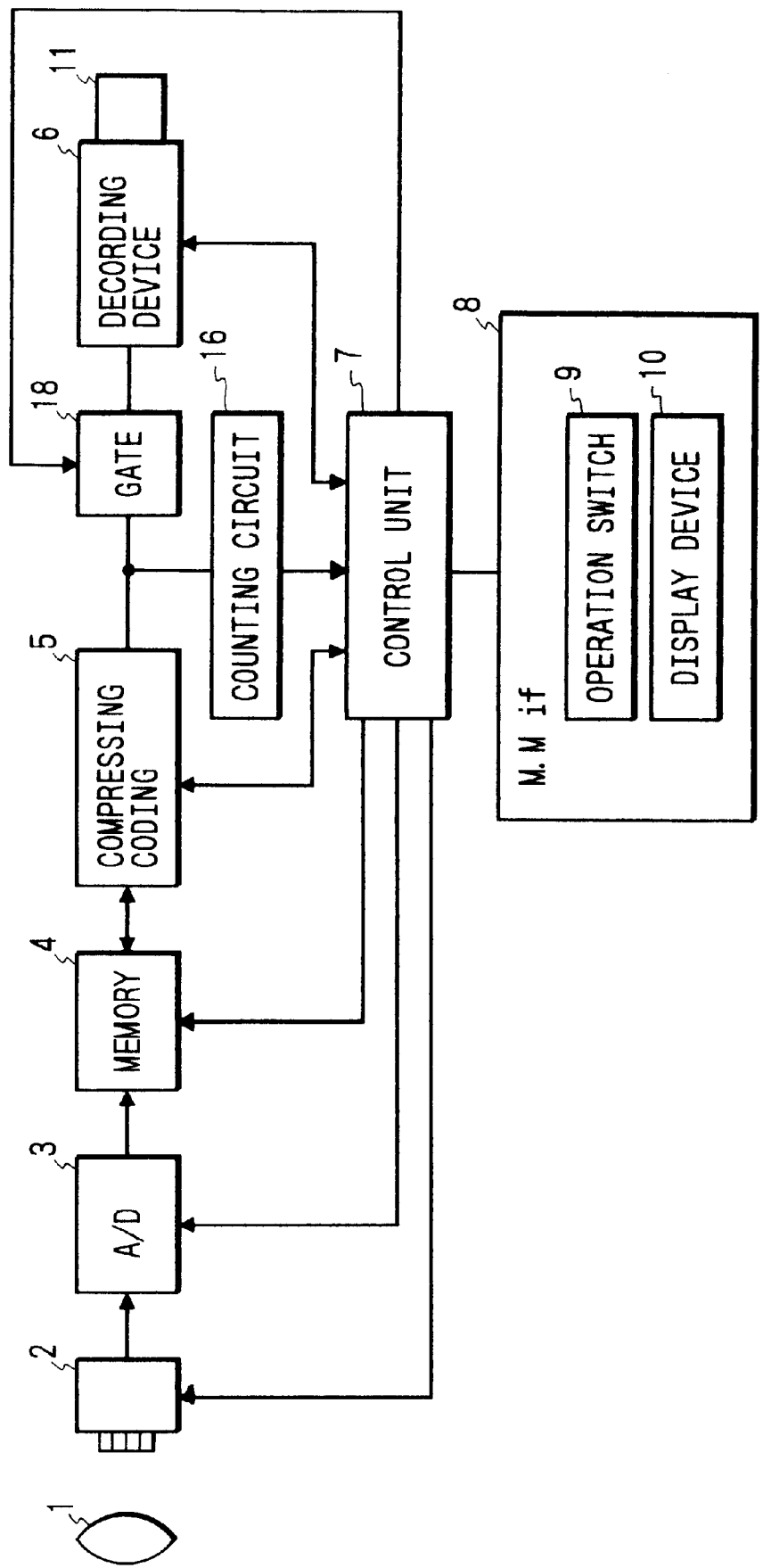
FIG. 1 is a block diagram of an embodiment of the present invention.

FIG. 1 is a block diagram of an embodiment of the present invention. Other parts of the camera not directly related to the present invention, such as the diaphragm and the shutter, are naturally provided but not shown. An optical image of an object, formed by a lens 1, is converted into an electrical image signal by an image pickup device 2, such as a charge-coupled device (CCD) positioned behind said lens. Said device 2 effects accumulation of charges corresponding to the optical image of the object and readout of image signal, in response to control signals given by a control unit 7. The obtained image signal is converted into a digital signal by an A/D converter 3. Between the image pickup device 2 and the A/D converter 3, there are provided means for regulating the image signal such as gamma correction, formation and separation of color signals, white balance process etc. though such means are not illustrated.

The digital image signal is stored in an image memory 4.

A compression encoding circuit 5 effects compression encoding on the image data read from the image memory 4 and sends the obtained codes to a recording unit 60 The control unit 7 is so constructed as to control the recording and reproducing for example with MS-DOS commands through the recording unit 60 The compression is conducted by a variable length encoding or a fixed length encoding, for example by DCT conversion of the image as will be explained later, followed by entropy encoding.

Also there is provided a function of counting the amount of compressed codes without the supply thereof to the recording unit 6. For this purpose there is provided a counting circuit 16 for counting the amount of compressed encoded data prior to the supply thereof to the recording unit 6.

The recording unit 6 is provided with a recording medium such as a semiconductor memory or a tape-shaped medium, is capable of information exchange with the control unit, of recording or reading of arbitrary digital data at an arbitrary physical address of the recording medium, and of counting the empty capacity of said recording medium.

The control unit 7 controls the entire apparatus by controlling the units 2–6, and is also capable of controlling the image data files in the recording medium, through the recording unit.

More specifically the control unit 7 correlates the file information with the physical addresses on the recording medium, as in a disk operating system employed in a computer system, and is therefore capable of controlling the mode of recording of files (compressed image data) on the recording medium, and also the empty capacity thereof. If the compressed codes have to be stored in divided plural parts with a limited recording unit each, the control unit 7 causes the recording unit 6 to record the compressed codes by designating the physical address on the medium and the data length for each recording unit. When an image file is recorded in plural positions on the recording medium, the control unit 7 also records information indicating said positions, on the recording medium.

A man-machine interface (MMIF) 8 includes an operation member 9 for actuating switches SW1, SW2 for shutter releasing and other switches to be explained later, and display devices 10 including a display in the view finders an external LCD display, a buzzer etc.

In an actual phototaking operation, the number of recordable images is displayed as will be explained in the following, with reference to a flow chart shown in FIG. 3.

(1) At first the control unit 7 sends commands DIR, CHK, DSK to the recording unit 6 to release the empty capacity therefrom (S1). When a shutter release button is depressed by a half stroke (switch SW1 on) for a phototaking operation, the control unit effects focusing by driving the lens 1, then activates the diaphragm and the shutter thereby exposing the image pickup device (S5) fetches the image information in the memory (S7) and effects compression encoding (S9). The control unit causes the counting circuit 16 to count the amount of codes of the image data, also causes the recording unit to count the empty capacity and calculates, from thus obtained data, the number of frames that can be recorded (S11). Said number is obtained for example by dividing the empty capacity with the amount of codes of image data Thus calculated value is informed to the user by a display device 10 provided in the view finder (S13). The display is continued while the switch SW1 is closed (S15, S17). When the shutter releasing button is depressed deeper for the phototaking operation, the sequence branches from the step S17 to steps S19, S21 and S23 to effect similar operations as those in the steps S5, S7 and S9, thereby fetching anew an image to be actually recorded.

(2) When a continuous phototaking mode is not selected, the sequence branches from a step S25 to the step S3. On the other hand, when said mode is selected, the empty capacity of the recording medium will decrease with the phototaking operations, and the amount of codes of image data per frame may also vary. Thus, after the recording of the first frame in said mode, the empty capacity and the amount of image codes to be recorded next are counted after the recording of each frame (S23) and the decreasing number of recordable images is continuously displayed in the view finder (S29).

Thus, in the present embodiment, if the continuous recording mode is selected and while the switch SW2 is kept closed, the images are fetched in the memory, encoded and stored in succession. In this operation, the number of recordable images is calculated from the amount of codes of the image recorded immediately before and the empty capacity of the recording medium, and the decreased number of recordable images is displayed, in the present embodiment, in succession in the view finder. However such display need not necessarily be made in the view finder.

Figure 3:
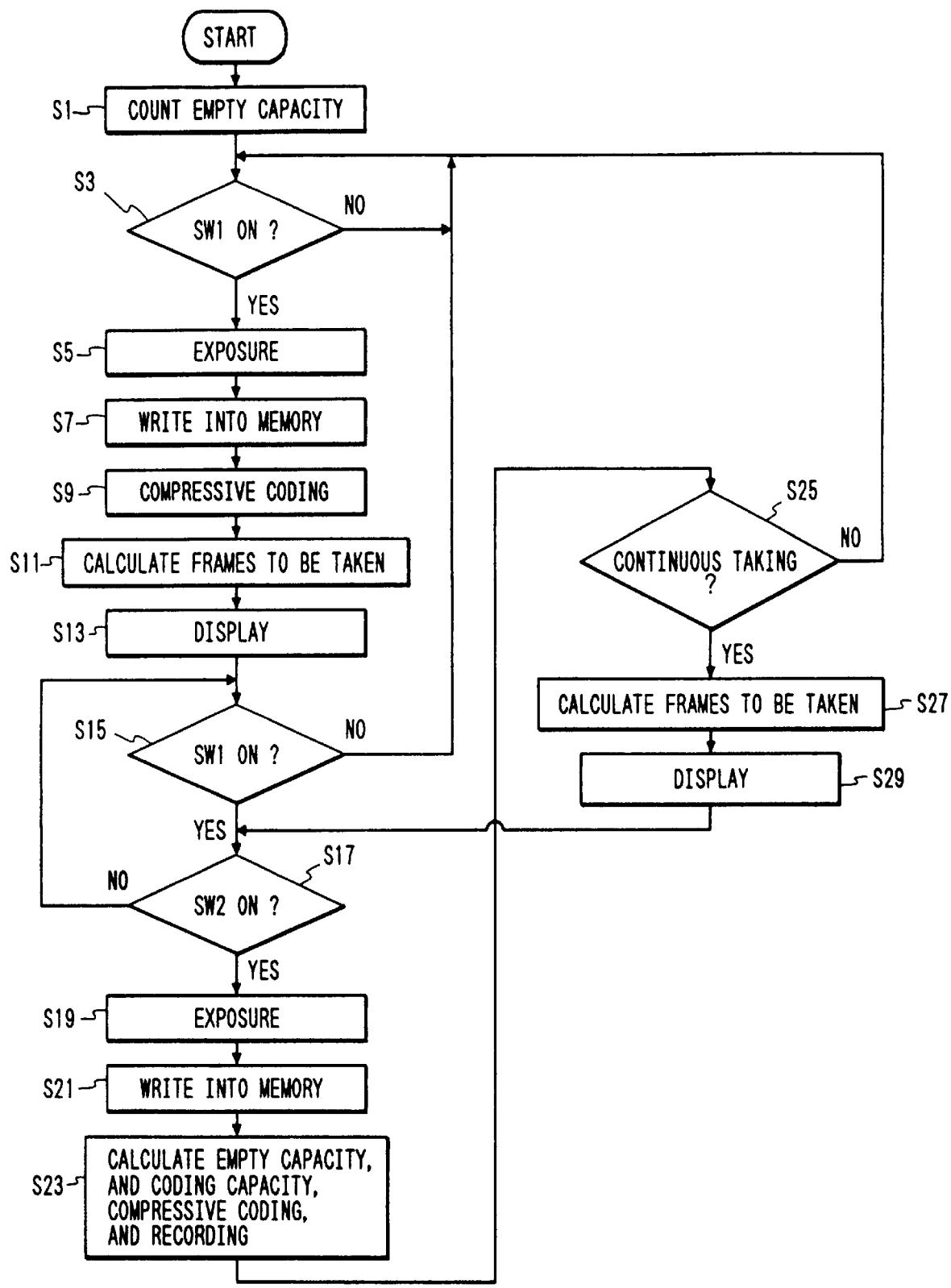
FIG. 3 is a flow chart of the control sequence of the apparatus shown in FIG. 1.
Figure 4:
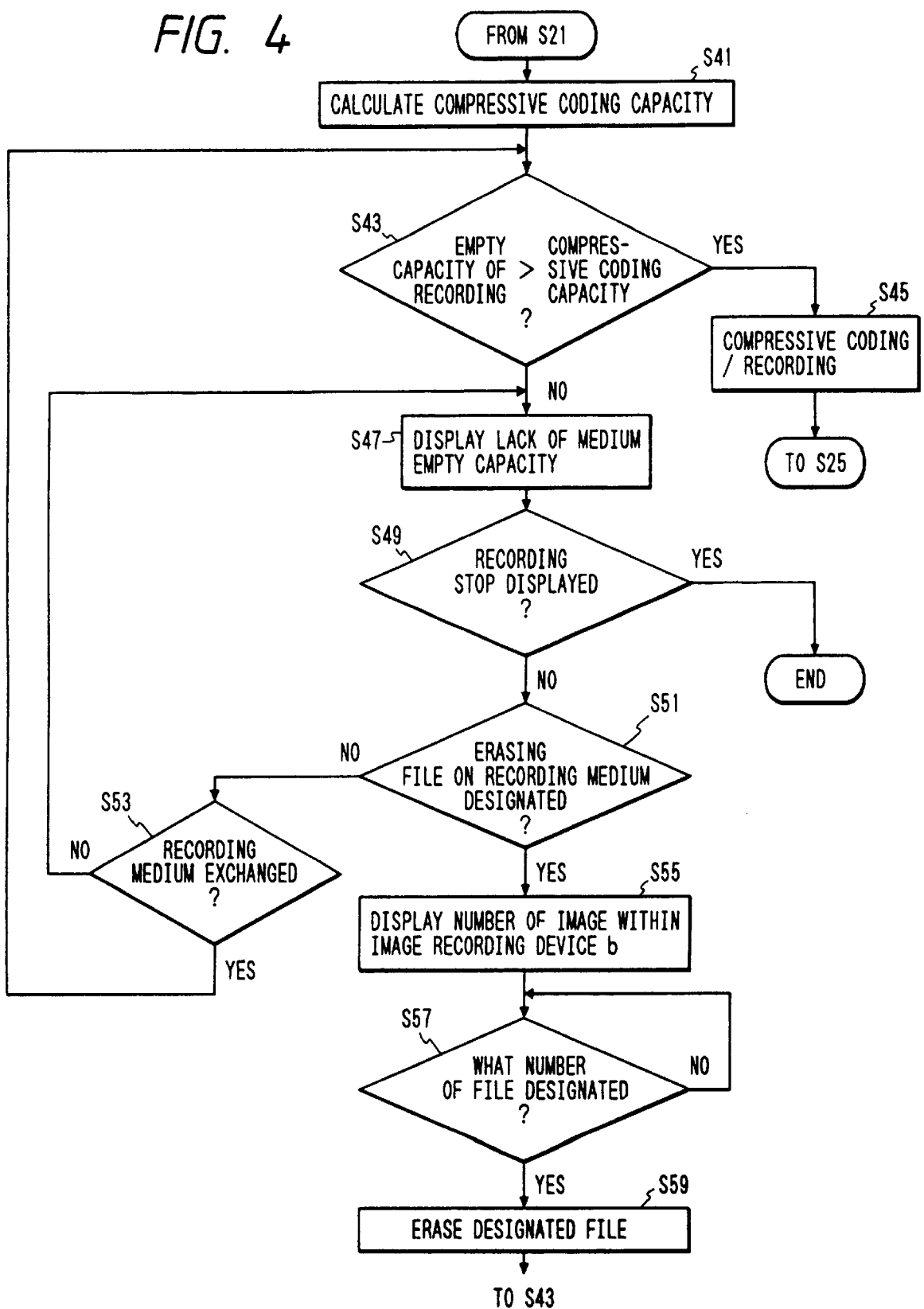
FIGS. 4 and 5 are flow charts showing details of parts of the flow chart shown in FIG. 3.

The details of the steps S21, S23 in FIG. 3 are shown in FIG. 4.

The sequence shown in FIG. 4 is conducted after the step S23 in FIG. 3, namely storage of the image data in the memory 4.

Referring to FIG. 4, the image signal stored in the memory 4 is read and compression encoded in the encoding circuit 5, and thus compression encoded data are counting circuit 16 (S41). Then the amount of the compressed codes is compared with the empty capacity of the recording medium in the recording unit 6 (S43), and, if there is an enough empty capacity, a gate 18 is so controlled as to read the image signal again from the memory 4, to effect the compression encoding and to send the data to the recording unit 6 for recording.

In this case the control unit 7 instructs the image memory to effect the readout of the image data, the compression encoding circuit 5 to release the compressed codes, the recording unit 6 to record the compressed codes, and the gate 18 to open the gate. It also designates the physical address and the data length on the medium for each recording unit to the recording unit 6 thereby recording the compressed codes. Unless a recording command is given by the control unit 7, the recording unit 6 does not request the data output from the compression encoding circuit 5, so that the function of said circuit 5 and the image memory 4 is interrupted. Thus the control unit 7 can achieve the recording operation through the control of the functions of the compression encoding circuit 5 and the image memory 4, by designating the physical address and the data length on the recording medium for each recording unit according to the filing format, to the recording unit.

The recording operation is completed when all the compressed codes are recorded.

Figure 2:
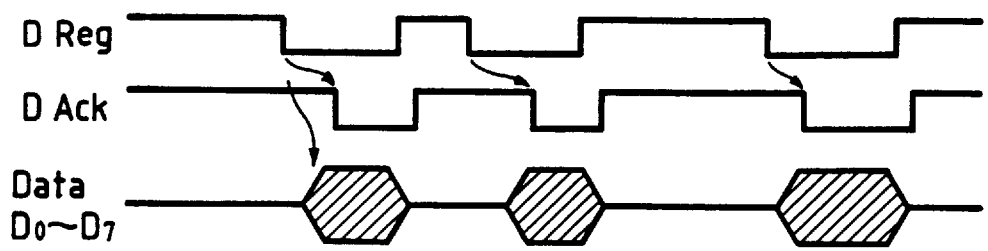
FIG. 2 is a timing chart showing the function of the apparatus shown in FIG. 1.

FIG. 2 shows the communication protocol between the control unit 7 and the recording unit 6.

In FIG. 2, there are shown a data output request signal D-Req from the recording unit 6 to the control unit 7, a signal D-Ack supplied from the control unit 7 to the recording unit 6 and indicating that the.data from the compression encoding circuit 5 to the recording unit 6 are effective; and 8-bit parallel output data D0–D7 supplied from the compression encoding circuit 5 to the recording unit 6.

FIG. 2 shows the output of data of one byte each, through the exchange of signals D-Req and D-Ack between the control unit 7 and the recording unit 6.

Referring to FIG. 2, the data receiver (namely recording unit 6) shifts the signal D-Req from the high level state to the low level state, thereby requesting the data transmitter (namely encoding circuit 5) to release the data. Detecting the low level state of said signal D-Req, the data transmitter release the data on the data bus (D0–D7), and shifts the signal D-Ack from the high to the low level state when the values of said data are fixed.

The data receiver fetches the signals on the data bus when the signal D-Ack is shifted to the low level state, and returns the signal D-Req to the high level state. The data transmitter terminates the data output to the data bus when the signal D-Req is shifted to the high level state, and returns the signal D-Ack to the high level state.

The data transfer is thus conducted by matching the function of the transmitter and the receiver through the above-explained hand-shake communications of the signals Req and Ack. Consequently the compression encoding circuit 5 need not generate the compressed codes with a fixed transfer rate, and the eventual variation in the code length depending on the image does not cause any inconvenience.

Now referring to FIG. 4 again, if the sequence proceeds from the step S43 to a step S47, the control unit causes the display unit 10 of the man-machine interface 8 to display that the recording operation is not possible because of an insufficient empty capacity of the recording medium, thereby requesting the user to select either one of the following three options:

(1) to interrupt the recording operation;
(2) to exchange the recording medium; and
(3) to erase one of the image files in the currently mounted recording medium.

For this purpose the control unit 7 executes the steps S49, S51 and S53.

If the option (1) is selected by the user, all the functions are interrupted from the step S49.

If the option (2) is selected by the user, namely if the recording unit 6 detects the replacement of the recording medium and informs the control unit 7 of that effect, the sequence returns to the step S43.

If the option (3) is selected by the user, the control unit 7 displays the number of recorded images on the display unit 10 (S55) D and requests the user to enter the sequential number of the image to be erased. In response to the entry by the user of the number of the image to be erased with the operation switches (S57), the control unit 7 erases the corresponding image file (S59) and the sequence returns to the step S43.

The replacement of the recording medium may be mechanically detected by the recording unit as disclosed in the Japanese Laid-open Patent Sho 61-182669. The control unit 7 can make access to the information on the presence of such replacement through the recording unit 6.

The above-explained control shown in FIG. 4 can ensure image recording to the user, even with a compression method with codes of variable length, thereby proving a system of improved convenience of use and still capable of guaranteeing the image quality.

Figure 5:
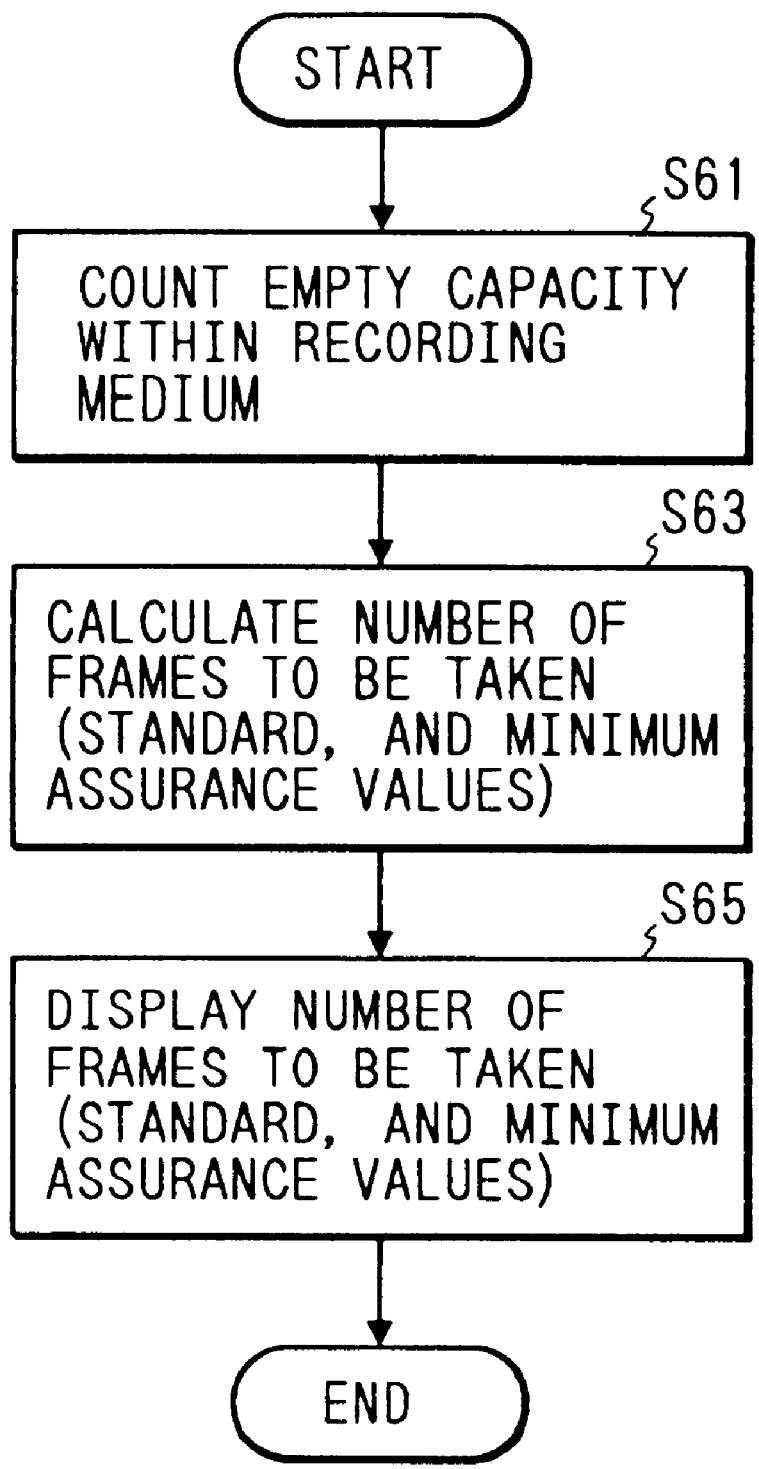

Now reference is made to FIG. 5 for explaining the method of displaying the number of recordable images, executed in the steps S11, S13 in FIG. 3.

The control unit 7 releases a command for detecting the empty capacity, thereby causing the recording unit 6 to count the empty capacity of the recording medium (S61) and calculates the number of images recordable on the recording mediume from said empty capacity and the pre-stored representative value of the compression rate of the variable length encoding method (S63).

As an example, a variable length encoding method disclosed in the Japanese Laid-open Patent Sho 63-124680 provides a code length of 2 bit/pixel in average or 4.5 bit/pixel at longest. Thus a step S65 displays, on the display unit 10, a standard number of recordable images calculated from the average code length of 2 bit/pixel, and a minimum guaranteed number of recordable images calculated from 4.5 bit/pixel. Naturally it is possible to display only either of said numbers. The display device 10 is composed for example of a liquid crystal display (LCD) or light-emitting diodes (LED), and can provide display in the upper part of the apparatus and/or in the view finder.

The above-explained embodiment provides a digital image recording apparatus employing variable length encoding, provided with means for counting the empty capacity of the recording medium and capable of storing the representative amount of compressed codes in variable length encoding, thereby calculating the number of images recordable on the recording medium from said calculated empty capacity and said representative amount, and further provided with means for displaying the calculated number of recordable images, thereby displaying a standard number and/or a minimum guaranteed number of images recordable on said recording medium.

Also in the above-explained embodiment, the empty capacity of the recording medium is detected not only in the step S1 in FIG. 3 but also in the steps S11, S13 of which details are shown in FIG. 5. Thus said empty capacity can be confirmed not only when the switch SW1 is closed but also in a continuous recording operation.

Also the present embodiment can improve the convenience of use and still can guarantee the image quality even with a variable length encoding method, since the amount of recorded images or the number of images recordable on the recording medium can be guaranteed and informed to the user.

Also in the present embodiment, the amount of encoded data is calculated, prior to the recording operation by the recording unit 6, by actual variable length encoding of the image signal which is obtained by photoelectric conversion of the object image and stored in the memory 4, but the present invention is not limited to such embodiment and said amount of encoded data may be obtained without actual variable length encoding. Therefore the prediction of data amount from a simplified encoding is also included in the present invention.

Also in the present embodiment the data to be stored in the recording medium are in advance stored in the memory 4, and a signal indicating the amount of encoded data obtained by variable length encoding of the data stored in said memory 4 is generated by actual variable length encoding of the image signal obtained by photoelectric conversion of the object image and stored in said memory 4. However the present invention is not limited to such embodiment, and the amount of encoded data may be obtained without the actual variable length encoding. Therefore, a prediction of the data amount for example by a simplified encoding is also included in the present invention.

Also the control unit 7 for executing the sequence shown in FIG. 4 controls said memory 4 according to the comparison of thus generated signal and said data amount.

As explained in the foregoing, the present embodiment controls means for storing in advance the information to be stored in the recording medium, according to the comparison of the empty capacity of said recording medium and the amount of encoded data to be recorded, and can therefore continue the storage of said information in said storage means, if necessary.

Also the present embodiment allows to know in advance the number of recordable images.

Also as explained in the foregoing, the present embodiment generates a value corresponding to the amount of variable length data by conversion of the object image prior to the recording operation by the recording unit, so that certain measures can be taken in advance if the recording operation is impossible due to an excessively large amount of encoded data.

Figure 7A:
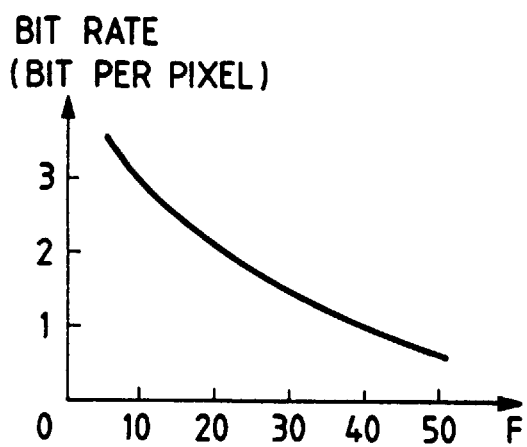
FIGS. 7A and 7B are charts for explaining the embodiment corresponding to FIG. 6.
Figure 7B:
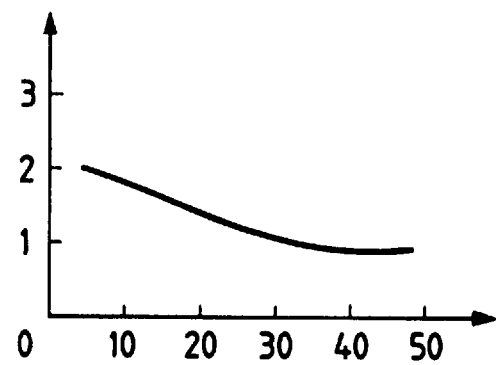

For obtaining fixed length codes and variable length codes in the present embodiment, there is already known an adaptive compression transformation (ADCT) method employing a dispersed cosine transformation (DCT) disclosed in "ISO/JTC1/SC2/WG8/N800". Such ADCT method can control the compression rate by an encoding parameter F. As shown in FIG. 7, the compression bit rate is a monotonously decreasing function of the parameter F. In FIG. 7, (a) and (b) show the relationship between the bit rate and F in different images. As will be understood from these charts, said relationship varies depending on the image but is always decreasing monotonously. It is therefore possible to obtained a desired bit rate through several trials with regulation of the parameter F.

In the present embodiment, the compression encoding circuit 5 can select variable length encoding or fixed length encoding, according to the aforementioned encoding method. More specifically, the variable length encoding is conducted with the encoding parameter F is fixed, and the fixed length encoding is conducted when the parameter F is varied to obtain a target code amount.

Also the control unit 7 can know such selection through the man-machine interface 8.

When the user selects a recorded image number preferential mode and depresses the shutter release button in said interfaces the control unit 7 controls the image pickup device 2, the A/D converter 3 and the image memory 4, thereby storing the digital data of the object image in said image memory 4.

Then the control unit 7 sets the parameter F of the compression encoding circuit 5, and causes said circuit 5 to compress the image data in the image memory and to count the compressed codes. In this stage said circuit 5 does not send the compressed codes to the recording unit but merely counts the amount of encoded data. This operation is repeated several times with different values of the parameter F. until a desired amount of encoded data is obtained.

When a value of F providing a desired amount of encoded data is obtained, the control unit 7 provides the compression encoding circuit 5 with said value, and instructs the recording unit 6 to release the compressed codes, thereby re-starting the compressing operation. Then the control unit 7 instructs the recording unit 6 to record the compressed codes. Through the above-explained operations, the compressed codes, with a fixed length for an image frame, are recorded by the recording unit.

In an image quality preferential mode, the control unit selects a sufficiently small value for the parameter F to be set in the encoding circuit 5, in order to avoid deterioration of the image quality. Thus the value of F is fixed, and the initial operation of determining the value F in the recorded image number preferential mode is not conducted in this case. Then the control unit causes the compression encoding circuit to compress the image data in the image memory for supply to the recording unit 6, and causes said recording unit 6 to record thus obtained compressed codes.

In the present embodiment, when the encoding method is switched between the fixed length encoding and the variable length encoding, the number of recordable images and the continuous recording speed are also varied accordingly. More specifically, in the fixed length encoding, the number of recordable images can be exactly calculated by dividing the empty capacity of the recording medium with the amount of codes, since the latter is fixed. However, said number cannot be exactly determined in the variable length encoding. Also the variable length encoding, involving repeated process of plural times, required a longer time before recording than in the fixed length encoding, so that the selectable continuous recording speed becomes lower. These facts influence the displays on the camera and the setting of the continuous recording speed.

In the present embodiment, the control unit 7 in the variable length encoding mode determines the number of recordable images by dividing the empty capacity of the recording medium with the standard or maximum code amount and displays said number. In the fixed length encoding mode, it decreases the upper limit of the selectable continuous recording speed.

Figures 1, 6:
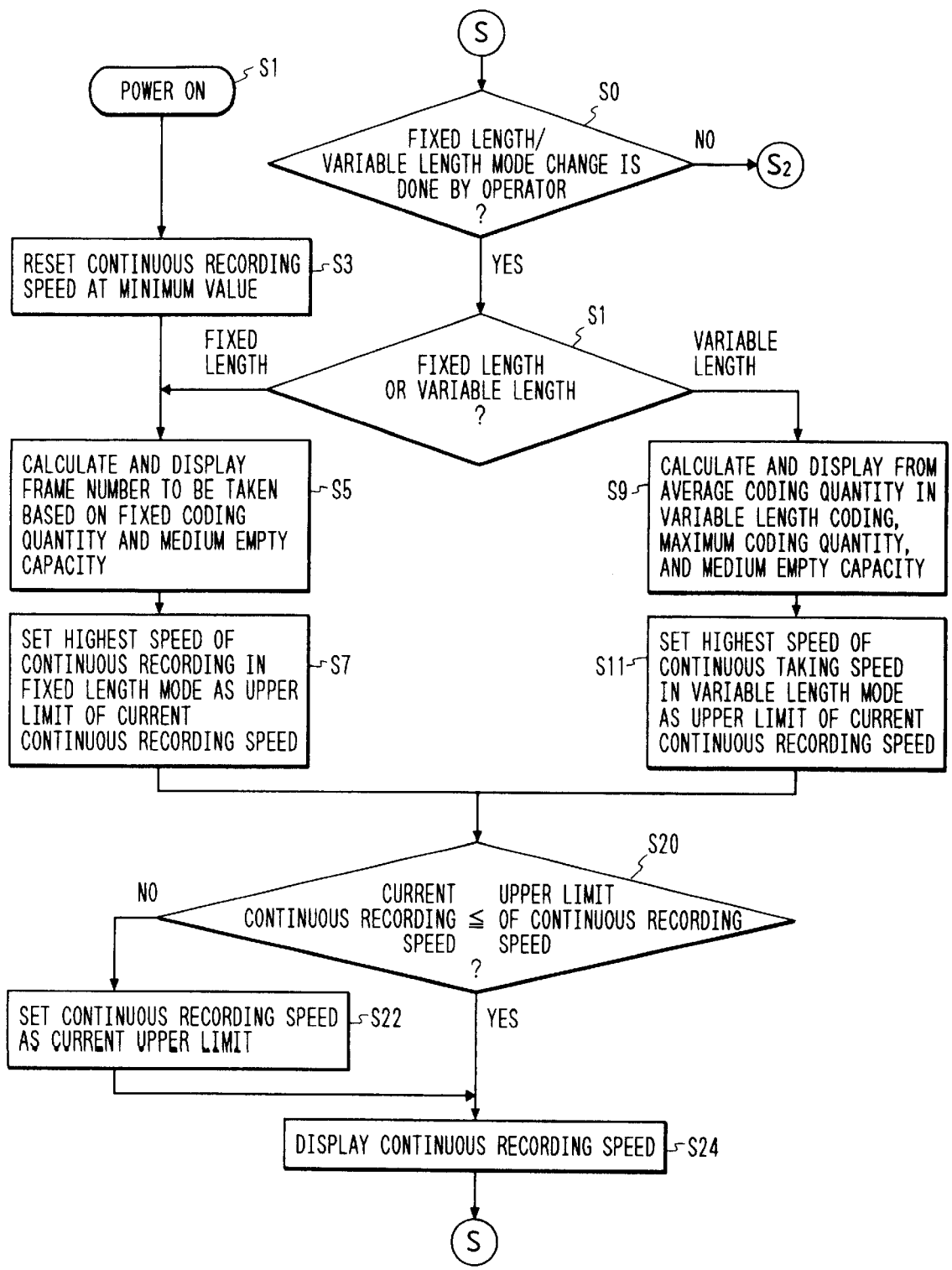
Figures 2, 6:
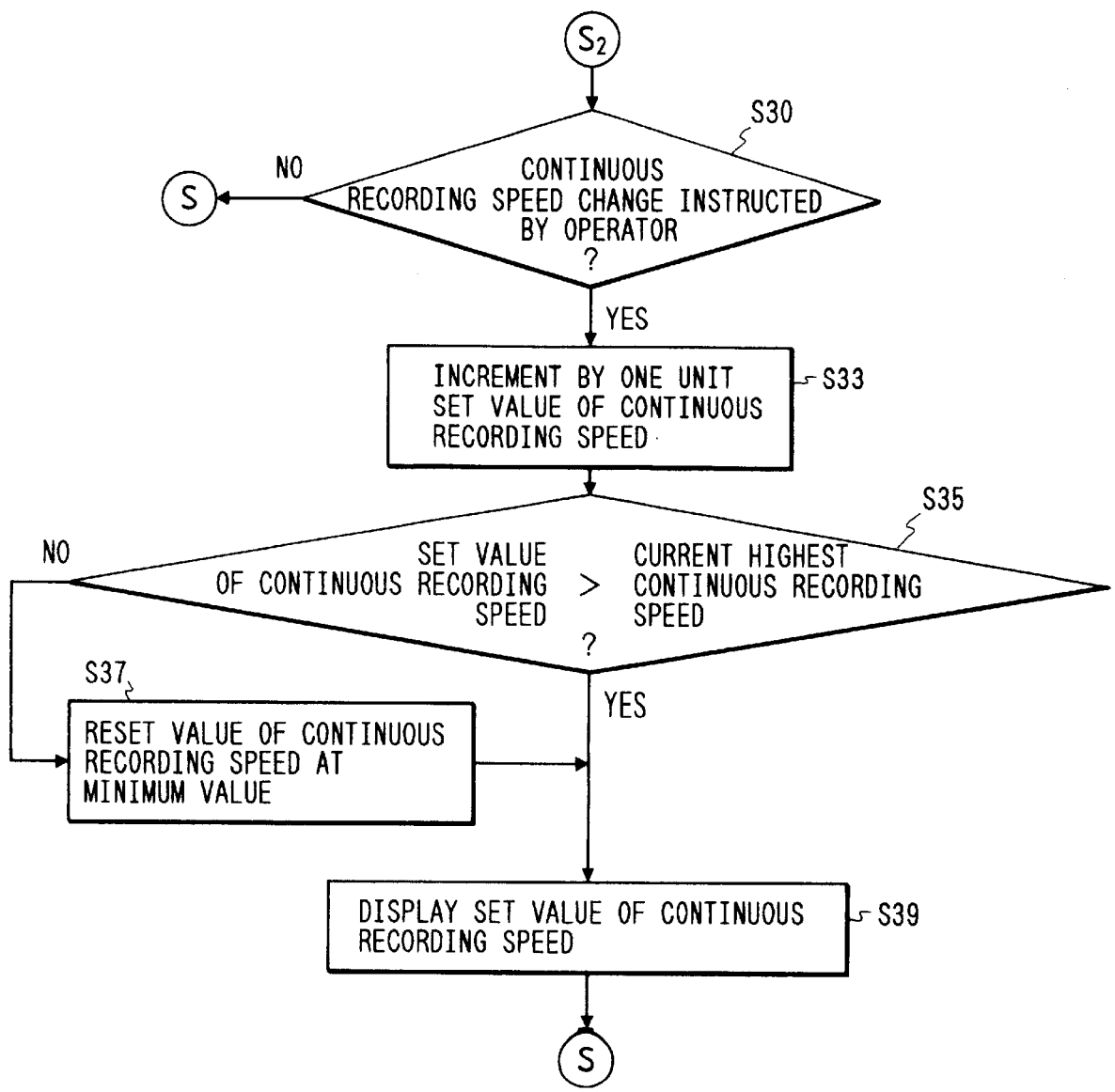

FIG. 6 is a flow chart for the above-explained procedures. At first, when the power supply is turned on (S1), for example the fixed length encoding mode is selected, and the minimum continuous recording speed is selected (S3).

The change of the fixed/variable length encoding mode is conducted by the user at a terminal S. Also if an instruction is given for varying the continuous recording speed, a corresponding procedure is conducted.

In case of such change, the sequence proceeds to a step S5 In case of the fixed length mode, the empty capacity of the recording medium is divided with the code amount, and the obtained number of recordable images is displayed, and the continuous recording speed is selected at the upper limit selectable in the fixed length mode (S7). In case of the variable length mode, said empty capacity is divided with the standard or maximum code amount and the obtained number of recordable image displayed (S9). Also the continuous recording speed is selected at the upper limit selectable in the variable length encoding mode (S11).

Then in a step S20, if the current set value of the continuous recording speed exceeds the selectable range of the continuous recording speed, said value is set at the upper limit of said selectable range (S22). Then the continuous recording speed is displayed (S24) and the sequence returns to the terminal S.

Also if an instruction is given to vary the continuous recording speed at S2, a step S30 discriminates whether the user has instructed to increase the continuous recording speed by a unit by depressing an operation button, and, if instructe, the sequence proceeds to a step S33 to increase the currently set value of said speed by a unit. Then thus increased speed is compared with the selectable range of the recording speed (S35), and if the former exceeds said range, the continuous recording speed is reset to the minimum speed (S37). Then the set value of the continuous recording speed is displayed (S39) and the sequence returns to S.

As explained in the foregoing, the present embodiment improves the convenience of use, by the presence of means for allowing the user to select the fixed length encoding mode or the variable length encoding mode, thereby giving preference to the image quality or to the number of recordable images.

Also in the fixed length encoding mode of the present embodiment, there can be selected a high continuous recording speed, because the time required for the encoding operation is fixed.

Also the compression encoding can be securely conducted because the upper limit of the continuous recording speed is automatically modified according to whether the compression encoding is conducted with a fixed length or a variable length.

The variable length compression encoding in the present embodiment may be conducted in other various encoding methods. For example there may be employed an entropy encoding on the DCT encoded data. There may be employed any encoding method as long as fixed length compression encoding and variable length compression encoding can be switched, so that both encodings need not be conducted by a same method.

In the present embodiment the recording unit 6 is composed of a data memory device controlled by an MS-D0S system, but there may also be employed other media, such as a semiconductor memory or a tape-shaped medium.

If the recording medium is composed of a floppy disk of vertical recording type, a capacity of 5M Bytes can be sufficiently provided with a diameter of 2 inches. In such case the present embodiment can guarantee the recording of 55 television field images at standard or 22 images at minimum.

In the present embodiment, the control unit 7 sends the commands DIR, CHK, DKS to the recording unit 6 for obtaining the information on the empty capacity of the memory means, but the control unit 7 directly detect the unrecorded area of the memory means, namely an unrecorded area for example on a tape.

Though the foregoing embodiment has been limited to so-called still video apparatus for recording still images on a recording medium, the present invention is not limited to such embodiment and is likewise applicable to a facsimile apparatus an electronic image file or the like.

We claim:

1. An image recording apparatus comprising:
    first means for converting an object image into an image signal and for generating variable length coded data, an amount of which varies dependently upon the object image being converted;
    recording means for recording the variable length coded data on a recording medium having a fix recordable capacity;
    setting means for setting said recording means in a recording stand-by mode;
    actuation means for operating said first means in accordance with setting of the stand-by mode set by said setting means;
    calculation means for calculating an amount of variable length coded data produced by the first means; and
    estimating means for estimating, prior to storing the variable length coded data, a possible number of recordable images to be recorded on the basis of a result obtained by calculating an amount of said variable length coded data.

2. An image forming apparatus according to claim 1, wherein
    said first means comprises
    generation means for photoelectrically converting said object image to produce said image signal; and
    transforming means for transforming said image signal produced by said generation means into said variable length coded data.

3. An image recording apparatus according to claim 1, wherein
    said medium is a semiconductor memory.

4. An image recording apparatus according to claim 1, wherein
    said medium is a disk memory.

5. An image recording apparatus according to claim 1, further comprising control means for controlling said apparatus according to said amount of variable length coded data produced by said first means.

6. An image recording apparatus according to claim 1, further comprising first generation means for generation information indicating a quantity of data capable of being recorded in the medium based on said amount of available memory space, and second means for generating data of a number of frames capable of being recorded in said medium based on a value relating to said quantity of data capable of being recorded in said medium and said amount of variable length coded data.

7. A recording apparatus according to claim 1, further comprising a trigger generating means for generating a recording signal in response to a second manual operation to cause said recording means to perform an operation of recording said variable length coded data on said recording medium, wherein said setting means sets said stand-by mode in accordance with a first manual operation which prevents said recording means from performing an operation of recording said variable length coded data on said recording medium which is different from said second manual operation.

8. An image recording method comprising the steps of:
    setting in a stand-by mode an operation of recording variable length coded data on a recording medium;
    converting an object image into an image signal;
    variable length compressing the image signal into variable length coded data, an amount of which varies dependently upon the object image being converted;
    determining an amount of said variable length coded data and an amount of available memory space remaining in the recording medium having a fix recordable capacity; and
    estimating, prior to storing the variable length coded data, a possible number of recordable images to be recorded on the basis of an obtained amount of said variable length coded data.

9. A method according to claim 8, wherein the converting step includes photoelectrically converting said object image to produce said image signal; and
    the coding step includes transforming the image signal produced in said converting step into said variable length coded data.

10. A method according to claim 8, wherein said recording medium is a semiconductor memory.

11. A method according to claim 8, wherein said recording medium is a disk memory.

12. A method according to claim 8, further comprising the step of controlling whether to perform an operation of recording said variable length coded data on said recording medium in accordance with both of the determined amounts.

13. A method according to claim 12, wherein said controlling step controls said recording means based on a value according to the quantity of data.

14. A method according to claim 8, further comprising the step of generating information indicating a quantity of data capable of being recorded in said recording medium based on said amount of available memory space, and a second step of generating data of a number of frames capable of being recorded in said recording medium based on a value relating to said quantity of data capable of being recorded in said recording medium said amount of variable length coded data.

15. A method according to claim 8, further comprising the step of generating a recording signal in response to a second manual operation to cause an operation of recording said variable length coded data on said recording medium, wherein said setting step sets said stand-by mode in accordance with a first manual operation which prevents an operation of recording said variable length coded data on said recording medium that is different from said second manual operation.

16. An apparatus comprising:

inputting means for inputting image data;

coding means for variable length coding the image data, an amount of the coded image data being variably dependent upon the image data being coded;

outputting means for outputting the variable length coded data;

indicating means for indicating to output the variable length coded data from said outputting means;

stand-by mode setting means for setting the apparatus into a stand-by mode;

obtaining means for obtaining a quantity of data of the variable length coded data in response to a setting of a stand-by mode; and means for estimating, prior to storing the variable length coded data, a possible number of recordable images to be recorded based on the obtained quantity of the variable length coded data.

17. An apparatus according to claim 16, wherein said inputting means includes CCD.

18. An apparatus according to claim 16, further comprising recording means for recording the variable length coded data to a recording medium.

19. An apparatus according to claim 18, wherein said recording means includes a magnetic recording medium.

20. An image recording apparatus comprising:

first means for converting an object image into an image signal and for generating variable length coded data, an amount of which varies dependently upon the object image being converted;

recording means for recording the variable length coded data on a recording medium having a fix recordable capacity;

setting means for setting said recording means in a recording stand-by mode;

actuation means for operating said first means in accordance with setting of the stand-by mode set by said setting means;

calculation means for calculating an amount of variable length coded data produced by the first means; and image output means for estimating and visibly outputting a possible number of recordable images by compressing the object image prior to executing an image recording.

21. An image recording method comprising the steps of:

setting in a stand-by mode an operation of recording variable length coded data on a recording medium;

converting an object image into an image signal;

variable length compressing the image signal into variable length coded data, an amount of which varies dependently upon the object image being converted;

determining an amount of said variable length coded data and an amount of available memory space remaining in the recording medium having a fix recordable capacity; and estimating and visibly outputting a possible number of recordable images by compressing the object image prior to executing an image recording.

22. An apparatus comprising:

inputting means for inputting image data;

coding means for variable length coding the image data, an amount of the coded image data being variably dependent upon the image data being coded;

outputting means for outputting the variable length coded data;

indicating means for indicating to output the variable length coded data from said outputting means;

stand-by mode setting means for setting the apparatus into a stand-by mode;

obtaining means for obtaining a quantity of data of the variable length coded data in response to a setting of a stand-by mode; and image output means for estimating and visibly outputting a possible number of recordable images by compressing the object image prior to executing an image recording.

* * * * *

UNITED STATES PATENT AND TRADEMARK OFFICE
CERTIFICATE OF CORRECTION

PATENT NO. : 5,903,677

DATED : May 11, 1999

INVENTORS : Masato Kosugi, et al.

It is certified that error appears in the above-identified patent and that said Letters Patent is hereby corrected as shown below:

COLUMN 1

Line 40, "quality" should read --quality.--;
   Line 45, "medium" should read --medium.--;
   Line 50, "medium" should read --medium.--; and
   Line 67, "operation" should read --operation.--.

COLUMN 3

Line 1, "unit 60" should read --unit 60.--;
   Line 4, "unit 60" should read --unit 60.--;
   Line 39, "finders" should read --finder,--; and
   Line 59, "data" should read --data.--.

COLUMN 4

Line 61, "the.data" should read --the data--.

COLUMN 7

Line 30, "with" should read --when--; and
   Line 48, "F." should read --F,--.

COLUMN 8

Line 30, "step S5" should read --step S5.--.

UNITED STATES PATENT AND TRADEMARK OFFICE
CERTIFICATE OF CORRECTION

PATENT NO. : 5,903,677

DATED : May 11, 1999

INVENTORS : Masato Kosugi, et al.

It is certified that error appears in the above-identified patent and that said Letters Patent is hereby corrected as shown below:

COLUMN 9

Line 15, "MS-D0S" should read --MS-DOS--;
Line 34, "apparatus" should read --apparatus,--;
Line 42, "fix" should read --fixed--; and
Line 58, "comprises" should read --comprises:--.

COLUMN 10

Line 8, "generation" should read --generating--; and
Line 36, "fix" should read --fixed--.

COLUMN 11

Line 30, "CCD" should read --a CCD--; and
Line 42, "fix" should read --fixed--.

COLUMN 12

Line 20, "fix" should read --fixed--.

Signed and Sealed this

Thirtieth Day of November, 1999

Attest:

Q. TODD DICKINSON

*Attesting Officer*    *Acting Commissioner of Patents and Trademarks*